Nov. 16, 1943.                R. STOVER                    2,334,296
            APPARATUS FOR CONVERTING EDIBLE COMPOSITIONS
                    Filed March 4, 1941           4 Sheets-Sheet 1
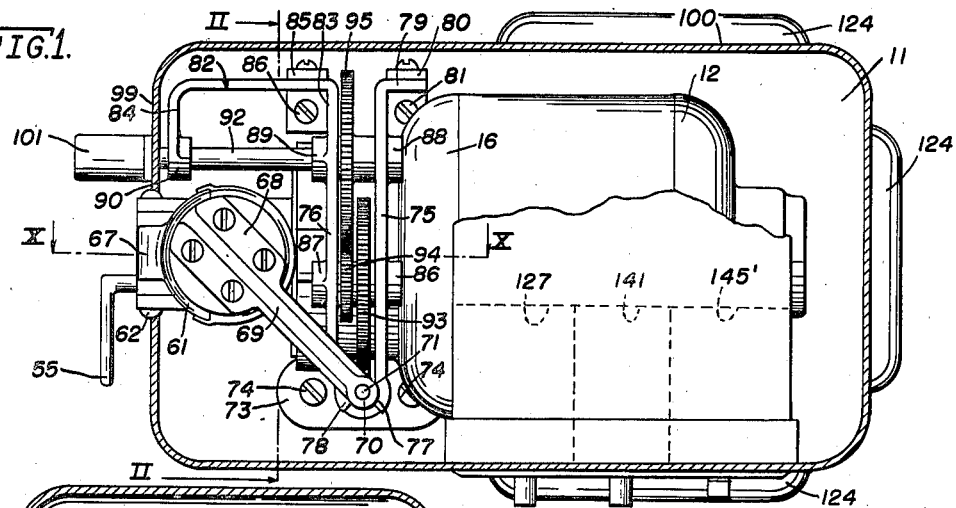
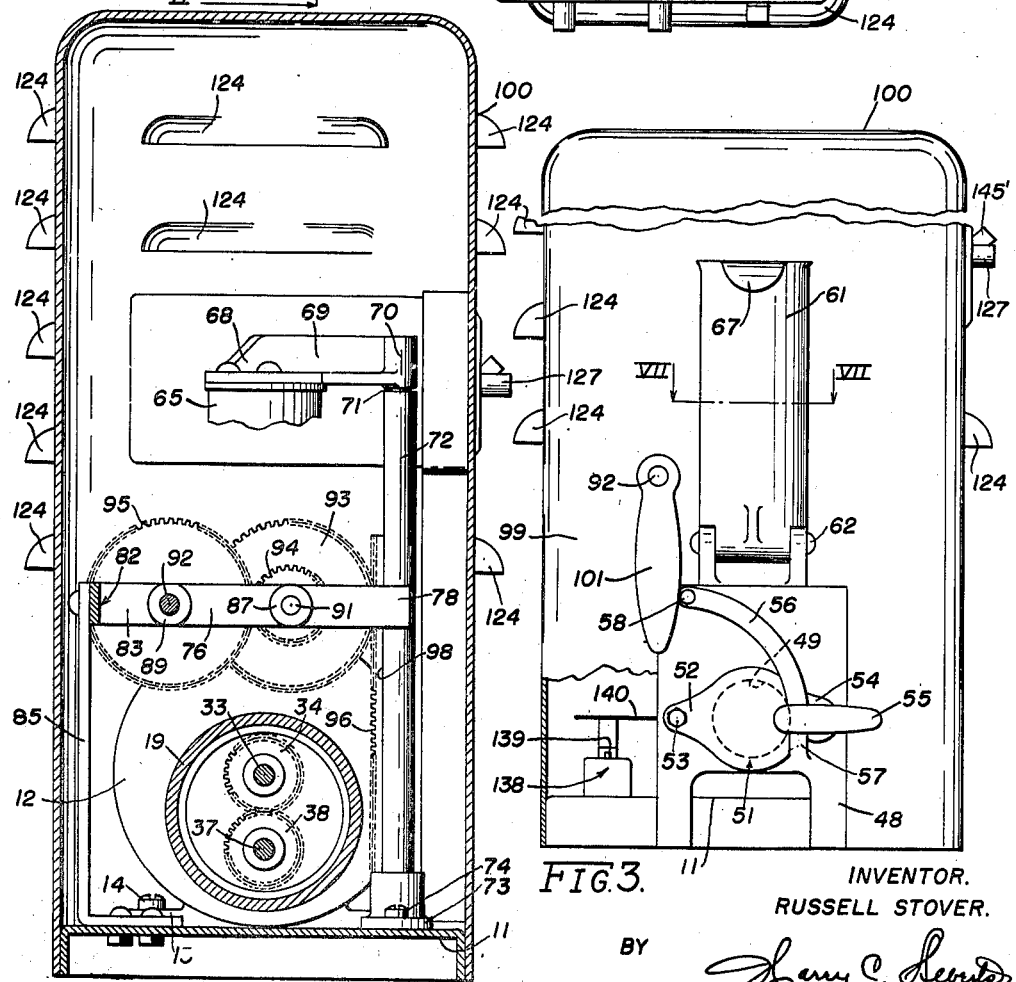
INVENTOR.
RUSSELL STOVER.
BY
*Harry C. Leavitz*
ATTORNEY.

Nov. 16, 1943. R. STOVER 2,334,296
APPARATUS FOR CONVERTING EDIBLE COMPOSITIONS
Filed March 4, 1941 4 Sheets-Sheet 2

INVENTOR.
RUSSELL STOVER.
BY
ATTORNEY.

Nov. 16, 1943.  R. STOVER  2,334,296
APPARATUS FOR CONVERTING EDIBLE COMPOSITIONS
Filed March 4, 1941  4 Sheets-Sheet 3
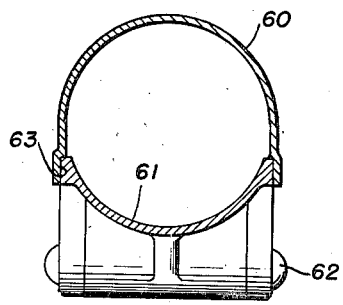
FIG.7.
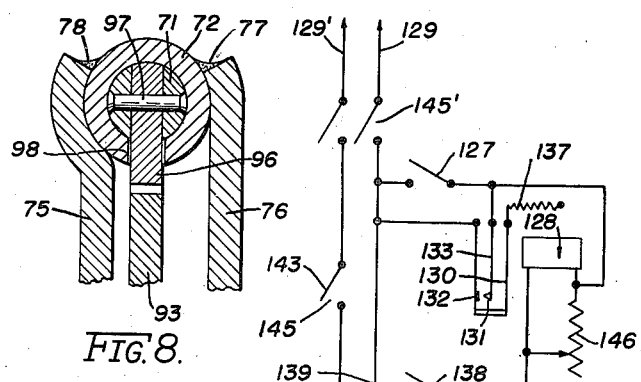
FIG.8.
FIG.9.
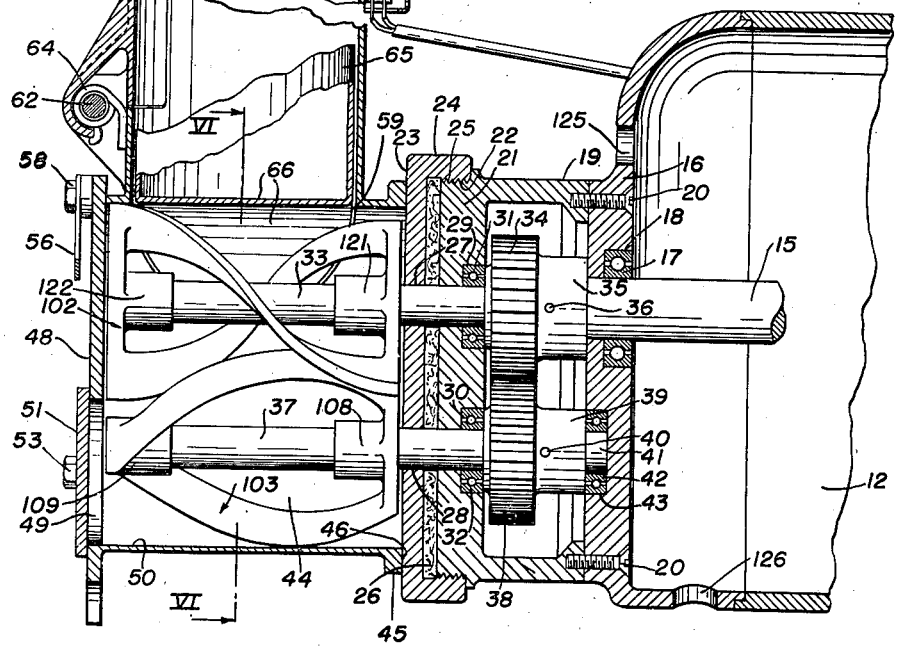
FIG.10.
INVENTOR.
RUSSELL STOVER.
BY Larry C. Lebnits
ATTORNEY.

Nov. 16, 1943.　　　　R. STOVER　　　　2,334,296
APPARATUS FOR CONVERTING EDIBLE COMPOSITIONS
Filed March 4, 1941　　　4 Sheets-Sheet 4

INVENTOR.
RUSSELL STOVER.
BY *Harry C. Beouter*
ATTORNEY.

Patented Nov. 16, 1943

2,334,296

UNITED STATES PATENT OFFICE 2,334,296

APPARATUS FOR CONVERTING EDIBLE COMPOSITIONS

Russell Stover, Kansas City, Mo.

Application March 4, 1941, Serial No. 381,726

20 Claims. (Cl. 259—10)

This invention relates to an apparatus for converting edible compositions into a more delectable state and more especially to convert solidified composite substances into a homogeneous plastic mass of predetermined consistency, although certain features thereof may be employed with equal advantage for kindred purposes. This application is a continuation-in-part of my copending application Serial Number 212,913 and filed June 10, 1938.

It contemplates more especially the provision of improved means for changing the texture of normally liquid compositions frozen to a substantially solid state of predetermined volume or mass to convert such into a more delectable plastic consistency and a better tasting product vendible over the counter in pre-measured quantities or units for consumption with a spoon or other utensil in substantially the same state and substantially at the same temperature as ice cream discharged direct from the customary batch or continuous freezer.

Edible substances such as normally liquid compositions frozen or refrigerated for conversion into confections or sundaes have become increasingly popular for dispensing over the counter, but the objectionable feature thereof from a commercial standpoint is in the inability to pre-measure a quantity or unit to be dispensed for each order. As a result, accurate control of profits on compositions of this character that require preparation to order for immediate consumption over the counter, is impossible when such are vended in the usual manner known in the art. In fact, there is appreciable waste and surplus quantities prepared for each consumer because of the inability of the attendant to pre-measure such with any degree of accuracy or uniformity within the time allotted therefor. This substantially diminishes the profits otherwise realizable from such vendible compositions and, in fact, often results in a loss or at least requires the vendor to place a rather high price upon such refrigerated compositions sold in the form of drinks or frozen confections.

This is especially true of normally liquid compositions, since these must be combined at the time of their order and processed without the ability of carefully measuring each of the constituent ingredients without entailing appreciable time to the end that difficult problems are encountered in the normal vending of frozen milk mixtures and other refrigerated or cold composite confections which normally require care, speed, and attentive handling in order to render the commercial distribution of such commodities over the counter with any degree of uniformity in composition or volume of each order. Counter vending requires speedy service and preparation of multiple orders which the attendant usually handles simultaneously so that the exercise of care is difficult of attainment. Automatic control and treatment is, therefore, an advantageous expedient in over-the-counter fountain product preparation.

With the teachings of the present invention, the problems of pre-measuring as well as converting frozen or refrigerated confections of a composite character are rendered simple and expedient without entailing any appreciable care, involving time measuring variables or impairment due to non-uniformity in the resulting composition for prompt vending to the consumer over the counter. These difficulties are especially eliminated by starting out with a pre-measured composition of a normally liquid substance frozen to a substantially solid state preferably though not essentially with a predetermined air overrun therein and effecting the conversion thereof into a flowable plastic mass promptly upon order and without impairment to the constituents, taste characteristics, texture, or the desirable overrun usually imparted to products of this character for commercial as well as improved taste purposes.

Then, too, frozen products are preferably provided with an overrun ranging from fifty to seventy-five per cent for the best eating qualities depending upon the dictates of commercial practice and the processing thereof for conversion into a flowable or plastic mass and consumable with the aid of the customary utensils such as a spoon. Such conversion should not diminish the initial overrun, and may, if desired, increase the overrun to produce commercial as well as taste advantages. Should the initial overrun be too low in the frozen product, then the conversion treatment could impart the desired overrun thereto so that the final product is possessed of uniform specification as to texture, volume, overrun, and consistency without any degree of control exercised by the attendant.

This is especially true in frozen confections, refrigerated products such as malted milk drinks, milk shakes, edible frozen fruit compositions and cold compositions that are customarily mixed and served in a normally liquid or plastic state having a consistency suitable for consumption with the aid of a spoon or by drinking. With the teachings of the present invention, it has been found more desirable and capable of vending such compositions in an improved and more tasty semi-solid or flowable plastic state in pre-measured quantities with the proper overrun for consumption with a spoon. Such a product is uniform and possessed of improved taste characteristics with the original or increased air overrun therein depending upon the initial composition and the dictates of commercial practice. These advantages coupled with an accurately controlled uniformity in composition affording the ability of pre-measuring each order to a definite quantity without entailing any time or delay or variations, enables a predetermined profit control and at the same time affords the vendor the opportunity of reducing the price per serving owing to the elimination of waste and an unintentional surplus with each order.

The usual disadvantages have been overcome largely by producing large batches of a normally liquid composition on a production basis and converting such to a substantially solid state by simultaneous beating and freezing in order to impart thereto an air overrun preferably though not essentially ranging from fifty to one hundred per cent and retaining such during the conversion thereof into a substantially plastic state with predeterminable overrun depending upon the dictates of commercial practice. The normally liquid composition is rendered self-sustaining and form-retaining in predetermined units sufficient for instantly preparing an individual order over the counter. To this end, the factory produced units of a frozen edible composition are held at a definite hardness and rendered available in storage compartments of mechanical coolers for counter conversion into a substantially plastic mass of predetermined volume having substantially the same temperature and consistency of the usual ice cream freeze as it leaves the customary batch freezer, this being accomplished without refrigeration in a converter embodying features and the teachings of the present invention. The conversion is effected very rapidly and prior to any temperature reduction of the substances within the range of liquefaction.

The consumer will, therefore, receive a more palatable composition that is substantially 18° warmer in temperature than hardened ice cream ordinarily served at the fountain. The usual head discomfort experienced by some people during the consumption of hard ice cream or fountain served ice cream is entirely eliminated. This is accomplished with a fountain counter machine that speedily converts the refrigerated mass into a substantially semi-solid plastic having substantially the same consistency and temperature of ice cream that is discharged from a batch or continuous freezer without the required addition or incorporation of liquids such as milk. Then, too, different flavors of premeasured units can be successively processed in this manner with utmost flexibility depending upon the desires of each customer, since the mixing chamber is self-emptying with each operation. After conversion, the plastic edible composition is discharged into a receptacle such as a glass for consumption with the aid of a spoon or other utensil.

The treatment of edible compositions having preferably a much lower butter fat content than ice cream, in such a manner, results in a composition which is uniform in quality, consistency and quantity on a factory produced and tested basis which precludes each individual vendor from incorporating any variations as well as eliminates the necessity of relying upon attendants to measure and exercise care with each order so as to procure such standards to a certainty, thereby controlling quality, quantity, texture and volume to a factory prescribed standards without injecting human inaccuracies. As a result, frozen edible compositions of this character having preferably though not essentially a much lower butter fat content than ice cream, can be served more economically and with utmost uniformity in composition, consistency, flavor, quality and quantity without incorporating the elements of chance that are interposed by each attendant without detection.

This affords the national marketing of cold refrigerated compositions of much lower butter fat content than ice cream and yet having a smooth plastic consistency and the taste characteristics thereof as it normally leaves the batch ice cream freezer. This affords speedy serving of uniform quantities in an improved manner at less expense to the consumer and controlled cost to the vendor in predetermined quantities for each order without possible surplus or waste and with utmost uniformity in every possible respect. All of the disadvantages of vending drinks in a liquid state have been overcome with the teachings of the instant invention pertaining to a novel method of and apparatus for converting edible frozen compositions to a substantially plastic state having the consistency and substantially the temperature of ice cream at the time such leaves the standard freezer together with the taste characteristics thereof at less initial ingredient cost and without the uncontrollable loss now experienced because of waste.

This is accomplished by a counter attendant with special composition conversion equipment that does not entail much time, labor, and expensive machinery investment, and the heretofore uncontrolled expense occasioned by waste and variation in the initial compounding by the counter attendant. Much effort has heretofore been expended to accomplish individual servings of normally liquid frozen edible compositions in their plastic state without much success and there always has been a demand for such edible compositions in that many individuals prefer the taste of ice cream and similar compositions at a consistency and temperature (approximating 23° F.) of the freeze as it leaves the batch freezer just prior to storage in a hardening room, but it is impossible to retain such in this condition for serving over the counter on order. The freeze in a plastic state soon crystallizes, disintegrates and the constitutents separate so that such must be made specially for each order in a quantity equivalent for each serving.

One object of the present invention is to provide an improved device for preparing predetermined servings of normally liquid uniform edible compositions in a substantially semi-solid or plastic chilled state.

Another object is to provide an improved device for producing individual servings of a substantially plastic edible refrigerated substance of normally unstable ingredients combined in a composite product that has improved taste and eating characteristics.

Still another object is to provide novel converting means for producing normally liquid edible compositions in the form of a substantially plastic edible freeze possessed of a predetermined or desired overrun.

A further object is to provide improved apparatus for converting composite refrigerated products of low butter fat content into a predetermined servings of chilled plastic substances having the taste and texture characteristics of freshly prepared ice cream coming direct from a batch or continuous freezer.

A still further object is to provide improved converting apparatus for producing or maintaining the proper overrun in a normally liquid composite material refrigerated to a substantially solid state for rapid conversion into a substantially plastic state preparatory to consumption.

Still a further object is to provide an improved conversion device for normally liquid composite edible substance frozen to a substantially solid state to effect the speedy re-conversion thereof with a selected overrun into a plastic consistency without incorporating a liquid preparatory to consumption with the aid of a spoon or other utensil.

An additional object is to provide improved means for converting individual servings of a substantially solid refrigerated mass into a plastic consistency without predetermined overrun therein and producing a pre-measured uniform mass of an edible composition therefrom.

Other objects and advantages will appear from the following description of an illustrative embodiment of the present invention.

In the drawings:

Figure 1 is a plan view of a device embodying features of the present invention, the external housing being broken away and shown in section to clarify the showing.

Figure 2 is a sectional view in elevation taken substantially along line II—II of Figure 1, parts thereof being fragmentary to show relationship of elements otherwise not involved in the sectional view.

Figure 3 is a front view in elevation of the device shown in Figures 1 and 2, parts being broken away to clarify the showing.

Figure 7 is a sectional view taken substantially along line VII—VII of Figure 3.

Figure 8 is a fragmentary sectional view taken substantially along line VII—VII of Figure 4.

Figure 9 is a schematic wiring diagram showing the control and power mechanism connections and circuit.

Figure 10 is a sectional view of the agitators, mixing and feeding chamber taken substantially along line X—X of Figure 1.

The structure selected for illustration comprises a processing apparatus for a composition of different edible ingredients in predetermined relation to present a frozen self-sustaining and form-retaining edible composition capable of rapid conversion into a predetermined quantity of a flowable plastic mass for consumption with the aid of a spoon or similar utensil. An edible composition capable of advantageous conversion in accordance with the teachings of the present invention, preferably though not essentially may comprise suitable proportions of 20% butter fat cream, 4% butter fat milk, skim milk powder, corn sugar, beet or cane sugar, daroloid, and vanilla, chocolate syrup, malted milk powder, or fruit intimately combined to provide a normally liquid composition capable of freezing into a substantially solid state.

Other edible compositions varying greatly in constituents and proportional quantities may be utilized for this purpose, and the above specified ingredients should be regarded as illustrative rather than as an essential requirement of the composition for processing in accordance with the teachings of the invention which constitutes the subject matter of this disclosure. Then, too, a substantial or nominal portion of dry malted milk powder may be incorporated into the initial composition, especially when chocolate flavored, to present or impart thereto the accustomed chocolate malted milk taste preferably in the presence of the chocolate syrup or vanilla syrup flavor or even without these ingredients should commercial practice so dictate.

This will depend largely upon the dictates of commercial practice and individual tastes so that the above composition is illustrative rather than a limitation or requirement. The ingredients are thoroughly mixed in much the same way as for the preparation of an ice cream mix, however possessed of ½ to ⅓ of the usual butter fat content thereof to provide a composition of less colorific value and capable of more effective counter conversion. Thereupon, the homogeneous mixture is converted into a substantially plastic state by resort to the customary ice cream freezers which are capable of imparting thereto an air overrun ranging from fifty to one-hundred per cent or more as may be desired.

Figure 4:
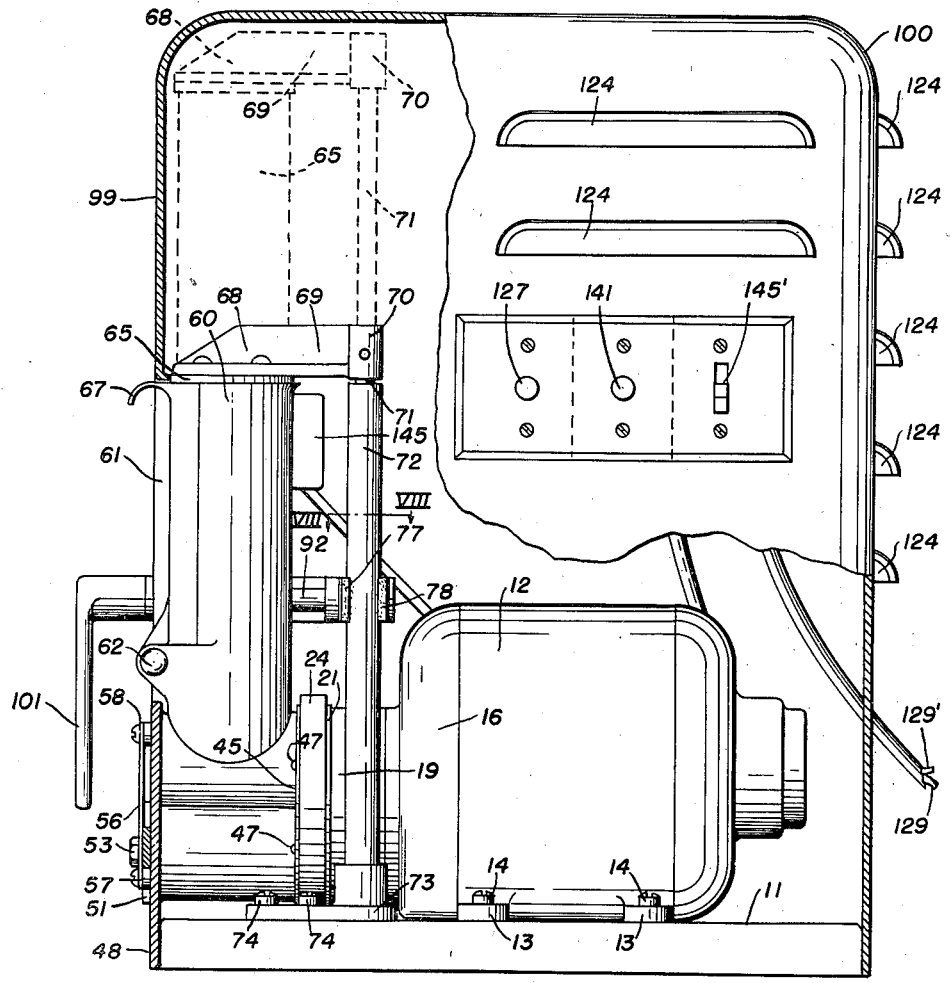
Figure 4 is a side sectional view in elevation taken along a broken line to remove part of the casing in order to clarify the showing.
Figure 5:
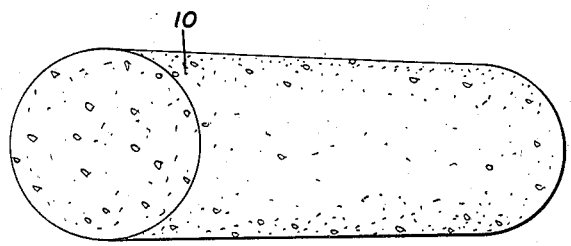
Figure 5 is a perspective view of a normally liquid edible composition frozen to a substantially solid state for instant conversion into a semi-solid plastic flowable composite mass with the aid of the instrumentalities shown in the preceding figures.

The resulting frozen flowable substance is poured or packaged or otherwise incorporated into suitable container molds to impart thereto a predetermined mass formation into cylindrical units or small bars 10 (Figure 5) or into large masses that are hardened by subjection to lower freezing temperatures over an extended period of time so as to enable cutting thereof into a plurality of small bars 10 approximating that shown in Figure 5. Usually, a battery of circular saws spaced apart for sufficient distance to sever the large mass of frozen material into a plurality of smaller bars 10, has been found to be a very efficient method of producing frozen bars which are premeasured in volume to provide a glassful of the resulting product in a manner to be described hereinafter; however, the predetermined units may take a cylindrical shape and be prepared in an entirely different manner by pouring the plastic freeze into elongated paper containers serving as molds such as disclosed in my copending patent application Serial Number 212,913 and filed June 10, 1938.

The normally liquid mixture is thus subjected to refrigeration for conversion into self-sustaining and form-retaining units or bars 10 of predetermined size and shape with the desired overrun that ranges between fifty to one hundred per cent or more and in practice should average seventy per cent for the best taste results. Thus, the mixture is first converted into predetermined self-sustaining and form-retaining edible units 10 suitably packed in cartons. These cartons are delivered to vendors in the presence of dry ice or other refrigerants so as to maintain the self-sustaining and form-retaining consistency of the edible units 10 and to enable the vendor to convert each bar or unit 10 into a more desirable state such as a flowable plastic mass that is discharged into a receptacle such as a glass for vending over the counter and immediate consumption with the aid of a utensil such as a spoon.

The size, density and shape of the initial edible self-sustaining and form-retaining frozen mass 10 may vary depending upon the dictates of commercial practice, and are delivered to vendors who are usually equipped with mechanically refrigerated storage cabinets which will maintain the bars or edible units 10 at the desired freezing temperature and solid consistency desired over an extended period of time in readiness for conversion upon order by a consumer. The edible self-sustaining and form-retaining units 10 of predetermined size and form are then converted into a delectable flowable mass having a pleasing temperature preferably though not essentially approximating 23° F. upon order of the consumer who intends to consume such in the form of a soft flowable freeze at the counter with the aid of a spoon.

To this end a specially efficacious converting device embodying features of the present invention, is provided on the counter for this particular purpose so as to speedily convert the premeasured size or volume of self-sustaining and form-retaining units such as the bars 10 into a predetermined quantity of a plastic flowable mass without impairment to or with the desired control of the initial overrun therein or adjusting the overrun should commercial practice so dictate to improve the texture, taste and flavor for consumption by drinking from a glass or preferably with the aid of a utensil such as a spoon.

The preferred embodiment of a machine embodying features of the present invention and capable of performing the method of converting normally liquid substances frozen to a substantially solid state into a flowable plastic mass possessed of the desired overrun in accordance with the teachings of the present invention, may comprise a base 11 preferably consisting of a flat plate member which serves to sustain a full load quick starting electric torque or propulsion-induction type motor 12. The electric motor 12 is, in this instance, provided with base flanges 13 that are perforated to receive threaded studs 14 therethrough to securely mount the motor 12 to the base 11. The motor 12 is preferably though not essentially of the self-starting torque type which starts off at full speed approximating 1750 R. P. M. As shown, the motor 12 has an armature shaft 15 extending through the forward motor casing plate 16 which is provided with a bearing 17 for journalled support of the armature shaft 15. The bearing 17 is disposed concentrically of the armature shaft bore 18 provided in the motor casing end wall 16.

The forward motor casing wall 16 of the motor 12 is preferably provided with an outwardly extending cylindrical gear housing 19 of corresponding size for axial attachment thereto by means of suitable fasteners such as stud bolts 20. In order to preclude oil and other foreign substances from escaping beyond the gear housing 19, the forward peripheral edge 21 is threaded as at 22 to receive a retainer plate 23 thereover. To this end, the packing retainer plate 23 is provided with a peripheral flange 24 that is inwardly threaded as at 25 to engage the correspondingly threaded peripheral edge 22 of the gear housing 19 to retain packing material 26 therebetween.

It will be noted that the stud bolts 20 extend through the motor casing plate 16 to engage the gear housing 19, thereby retaining the parts in assembled relation to confine the lubricants and the agitator operating instrumentalities as will appear more fully hereinafter. The gear housing 19 is, in this instance, provided with a pair of vertically aligned bores 27 and 28 extending through the forward wall thereof to communicate with inwardly countersunk recesses 29 and 30 that receive ball bearing raceways 31 and 32. The upper bore 27 is in axial alignment with the armature shaft bore 18 provided in the end motor casing plate wall 16 to support a beater or agitator shaft 33 that terminates in an integral gear 34 having an enlarged hub 35 for the reception of the armature shaft 15 therein. A pin 36 extends radially through the gear hub 35 to effect the connection thereof with the armature shaft 15 to rotate in unison therewith.

Figure 11:
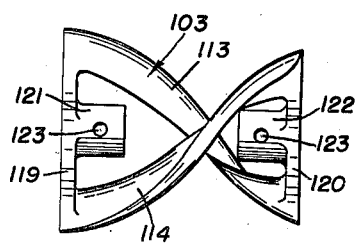
Figure 11 is a side view in elevation of a left hand helical agitator member constituting the lower comparatively dull edge beating and mixing instrumentalities shown in Figure 9.
Figure 12:
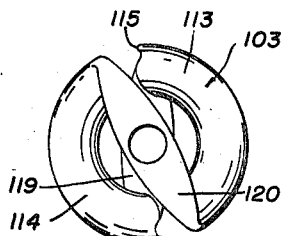
Figure 12 is an end view in elevation of the agitator element shown in Figure 11.
Figure 13:
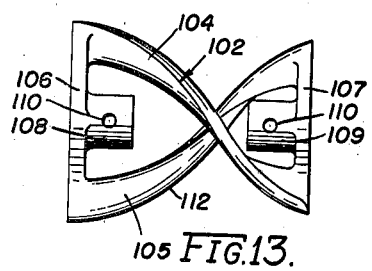
Figure 13 is a side view in elevation of a right hand helical agitator member constituting the upper comparatively sharp edge cutting and mixing instrumentality shown in Figure 10.

Another agitator shaft 37 is journalled in the lower gear housing bore 28 to receive a spur gear 38 corresponding in size and shape with the spur gear 34 for meshing alignment therewith within the gearing housing 19. As shown, the lower spur gear 38 is provided with an enlarged hub 39 extending axially therefrom to receive a pin 40 radially therethrough for attachment to the agitator shaft 37 proximate to the extremity 41 thereof. The agitator shaft extremity 41 is journalled in a ball bearing raceway 42 confined in a recess 43 provided in the end wall of the motor casing boss 16, thereby supporting the agitator shafts 33 and 37 in vertical spaced relation. While the direction of rotation is indicated as clockwise and counter-clockwise for the top and bottom agitator members (Figures 13 and 11, respectively), it should be observed that these blades to be hereinafter described may be provided with oppositely curved helixes to require opposite directional operation depending upon the dictates of commercial practice.

A mixer housing 44, in this instance of substantially numeral 8 design to avoid all dead space or ineffective mixing areas, is provided forwardly of the packing retainer plate 23 for attachment thereto. To this end, the mixer housing 44 is provided with a peripheral flange 45 that has a finished end surface 46 to contact the finished face of the plate 23 for attachment thereto by means of threaded studs 47 which extend therethrough. Should commercial practice so dictate, the mixer housing 44 may be formed integral with the retainer plate 23 so as to avoid the necessity of providing a threaded attachment therebetween through the medium of any fasteners 47. The forward wall 48 of the mixer housing 44 is formed integral therewith to provide a discharge orifice 49 proximate to the bottom 50 of the mixer housing 44 and substantially in axial alignment with the lower agitator shaft 37.

A closure plate 51 has a boss 52 formed thereon to enable the pivotal mounting thereof to the forward wall 48 by means of a stud 53 so as to afford the opening and closing thereof in the plane of the external surface of the forward mixing wall 48. Another boss 54 is formed on the end of the closure plate 51 in substantially symmetrical arrangement with the opposite pivotal mounting boss 52 to provide for the formation of a handle member 55 thereon. The handle member 55 is preferably though not essentially formed integral with the closure plate 51 so as to enable the manual opening and closing thereof relative to an arcuate retainer strap 56 comprising a part of or suitably attached as at 57 to the forward mixer wall 48.

The arcuate retainer strap 56 is preferably anchored at the other extremity 58 by riveting or otherwise to maintain the closure plate 51 in frictional contact with the forward mixer wall 48 (Figure 3) to establish sealing engagement over the discharge opening 49 of the mixer housing 44. In consequence thereof, the closure 51 serves as a valve for the discharge mixer housing orifice 49. The substantially 8-shaped mixer housing 44 is preferably provided with an intake orifice 59 that extends upwardly in the form of a hopper 60 having a substantially cylindrical configuration whose interior is sized to correspond with the configuration of the frozen substance unit or bar 10 for reception therein. The mixer housing 44 and the hopper 60 are preferably of comparatively thin sheet plate construction to minimize the heat capacity thereof and to provide better thermal conditions for the treatment of frozen substances which should lose the least possible cold thereto.

In the present embodiment, the intake hopper 60 extends upwardly and is somewhat larger in cross-section and longer than the predetermined size of the frozen substance unit 10 of pre-formed shape that is laterally inserted therein by lodgement on a side wall door 61. The door 61 is pivoted as at 62 to comprise a complement of an opening 63 in the hopper 60. The door 61 is impelled by a spring 64 to normally close the hopper wall opening 63 and to effect displacement of the unit 10 into the interior of the hopper 60 for feeding into the mixer housing 44 by means of a plunger 65. The plunger 65 is somewhat smaller in dimensional extent than the interior of the intake hopper 60, but corresponds in shape therewith to provide an arcuate bottom 66 constituting a closure member conforming to the contour of the top region of the mixing chamber 44. The unit displacing hopper door 61 has a curved lip 67 at its upper edge to provide a convenient finger engaging member to effect its opening displacement against the urge of the spring 64.

The plunger 65 serves to feed or displace the units 10 downwardly into the mixing chamber 44, by means of its attachment to a top bracket 68. The bracket 68 has an arm 69 which terminates in a bearing 70. The bracket arm bearing 70 is attached to the upper extremity of a rod 71 which is vertically reciprocable in an upstanding guide sleeve 72. The guide sleeve 72 terminates in a bottom flange 73 which is anchored to the base plate 11 by means of threaded studs 74. The guide sleeve 72 is supported midway of its vertical length by means of horizontal bracket plates 75 and 76 (Figures 1 and 8) which are welded thereto at their extremities 77—78, respectively. The other extremity 79 of the bracket plate 75, is offset for attachment to a vertical bracket 80 anchored as at 81 to the base plate 11.

The bracket plate 76 has a substantially U-shaped portion 82 providing confronting arms 83—84 which are supported by a vertical bracket 85 anchored to the base plate 11 as at 86 (Figure 1). The bracket plates 75—76 has aligned pairs of confronting bosses 86—87 and 88—89, respectively; and the latter are also in axial alignment with a boss 90 provided on the arm 84. The bosses 86—87 and 88—89—90 receive stub shafts 91 and 92 that are journalled therein to support a spur gear and pinion 93—94 and spur gear 95 thereon for rotation therewith.

The spur gear 93 meshes with a vertical rack 96 attached to the vertical rod 71 by means of rivet pins 97 (Figure 3) to elevate and lower the feeding plunger 65 operatively connected therewith. The rack 96 projects through a vertical slot 98 provided along the length of the guide sleeve 72. The spur gear 93 is rotated through the pinion 94 on shaft 91 that rotates responsive to the rotation of the spur gear 95 that meshes with the pinion gear 94. Rotation of the spur gear 95 is effected by the shaft 92 that extends through the front wall 99 of a housing 100. The housing 100 is complemental to the base plate 11. A lever 101 is fixed to the exteriorly accessible extremity of the shaft 92 for manual rotation to raise and lower the feed plunger 65 in somewhat less than one shaft revolution owing to the train of gears 93—94—95 described supra.

The lower end 66 of the feeding plunger 65 is of arcuately concave shape so as to correspond with the exterior contour of a top converter member 102 mounted on the shaft 33 within the mixer housing 44, thereby affording a minute clearance therewith when its top mixing closure plate 66 which is the bottom of the feeding plunger 65. It will thus be apparent that the preformed self-sustaining and form-retaining frozen substance unit 10 can be flipped by the door 61 into the hopper 60 for feeding displacement into the mixer housing 44 by means of the plunger 65 that forces the frozen substance into the path of the top sharp comminuting member 102 that cooperates with a lower agitator member 103 corresponding in general circular contour with the sharp-edged member 102 as will appear more fully hereinafter. This feeding is accomplished by the rotation of the lever 101.

Figure 14:
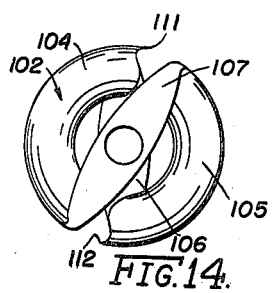
Figure 14 is an end view in elevation of the agitator shown in Figure 13.
Figure 15:
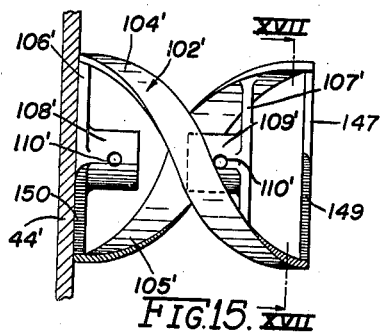
Figure 15 is a side view in elevation of a modified construction for the upper power comminuting and agitator member.
Figure 16:
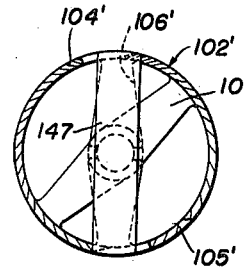
Figure 16 is an end view of the member shown in Figure 15.
Figure 17:
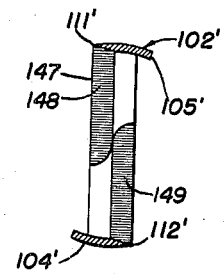
Figure 17 is a sectional view taken substantially along line XVII—XVII of Figure 15.
Figure 18:
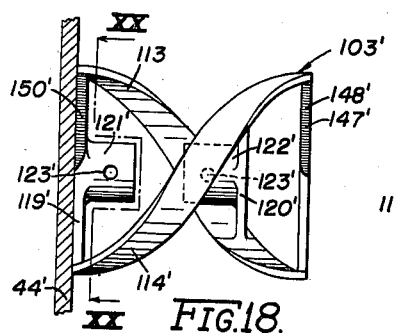
Figure 18 is a side view in elevation of a modified lower agitator and beating member for use in conjunction with the upper comminuting member shown in Figure 15.
Figure 19:
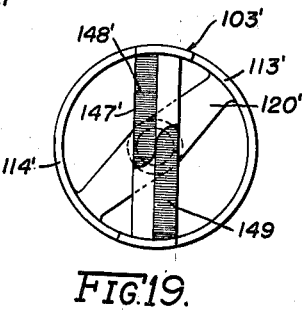
Figure 19 is a front end view of the agitator and beater member shown in Figure 18.
Figure 20:
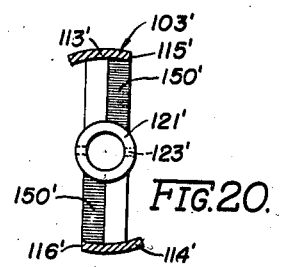
Figure 20 is a sectional view taken substantially along line XX—XX of Figure 19.

In order to effectively and more speedily convert the frozen self-sustaining and form-retaining edible unit 10 into a flowable plastic mass without impairment to the overrun therein and advantageously impart a somewhat increased overrun, if varied at all, the upper comminuter 102 and the lower agitator or beater 103 are helicularly shaped. The top comminuter member 102 comprises two blades 104 and 105 shaped substantially in the form of a helix to comprise circumferentially spaced cutters. In the present embodiment, the upper comminuter member 102 (Figure 13) has its blades 104 and 105 of helicular shape secured to vertical end members 106 and 107 provided with tubular aligned bosses 108 and 109 which are sized to fit over the agitator shaft 33. As shown, the tubular bosses 108 and 109 are provided with diametral apertures 110 to receive pins therethrough to effect the attachment of the upper comminuter member 102 to the shaft 33 for rotation therewith in a clockwise direction (viewed from Figure 14). The agitators 102 and 103 may be provided with a bayonet type slot connection rather than the pins prescribed herein so as to be readily removable for cleansing should commercial practice so dictate.

The blades 104 and 105 of the agitator 102 are shaped to provide right-hand helixes spaced substantially 180° apart for permanent attachment to the vertical end members 106 and 107. The helicular blades 104 and 105 may and, in the embodiment shown Figures 10 and 11 to 16, are provided with a compound reverse curve to present a substantially S cross-section with the outer edges 111 and 112 ground or otherwise shaped to present knife sharpness for effectively cutting and rapidly comminuting the edible frozen substances which preferably though not essentially is initially in a frozen solid state 10.

The lower agitator and beater 103 is shaped to correspond with the upper agitator 102 with the exception that the helicular curve of the blades 113 and 114 are left-handed in direction to enable the interpositioning thereof with the upper blades 104 and 105 (Figure 10) to minimize the space requirements therefor as well as to more effectively comminute, mix, agitate, beat and convert the initially solid substance with which the mixer housing 44 is charged, into a substantially plastic state. The cooperation of the plunger 65 with the sharp edged upper comminuting member 102, is effective in rapidly effecting the conversion with the minimum refrigeration loss.

Figure 6:
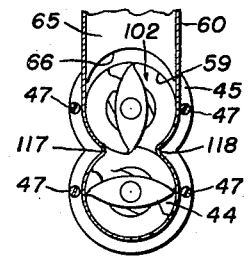
Figure 6 is a sectional view of the mixing housing taken substantially along line VI—VI of Figure 10.

In the lower beater or agitator 103, the forward edge 115 and 116 of the blades 113 and 114 are comparatively blunt so as to effectively agitate and beat the substance in cooperation with the upper comminuter or converter member 102. To reduce the body of the metal from which the mixer housing 44 is formed of sheet material so as to eliminate to at least minimize the cold absorption from the edible substance 10. To this end, the mixer housing 44 is provided with comparatively thin walls that tend to approach each other between the upper and lower agitator shafts 33 and 37 to provide substantially V-shaped horizontally confronting intermediate sections 117 and 118 (Figure 6) presenting a substantially "figure 8" shape that does not present any dead areas from a mixing standpoint.

In consequence thereof, the upper and lower portions of the mixer housing 44 conform substantially with the generally circular contour of the upper and lower comminuter and beater 102—103, respectively, as to effectively produce a homogeneous flowable plastic mass having proper overrun therein and the desired uniform smooth texture. This is effected within a short interval of as low as six seconds so that the resulting product will be cold and yet flowable for discharge responsive to the influence of the lower agitator or beater 103 into a receptacle such as a glass for consumption with the aid of a utensil such as a spoon. To procure the desired overrun in the converted substance, the blades 104—105 and 113—114 of the members 102 and 103, respectively, should be spaced from the walls of the housing 44 for at least $\frac{3}{32}$ to $\frac{1}{8}$ of an inch depending upon the size, capacity and speed of these instrumentalities.

The frozen self-sustaining and form-retaining unit 10 is purposely converted into a cold flowable plastic mass rather than a liquid in order to retain the desired overrun of at least seventy per cent and to enable the consumption with a spoon and to provide a more delectable product from a consumption standpoint. The lower agitator or beater 103 is provided with end members 119—120 having axially tubular bosses 121 and 122 for attachment to the lower agitator shaft 37 by means of pins extending through apertures 123 therein, this being accomplished in a manner similar to that described in connection with the upper comminuter 102.

The housing or shell 100 is preferably of ornamental design and appearance, it being a complement of the base 11 to enclose the instrumentalities described supra with the exception of the entrant door 61 communicating with the hopper 60 and the valve discharge orifice 49 and their auxiliary parts. Suitable louvres 124 are preferably provided in the walls of the shell 100 for ventilation purposes and similarly the end motor casing member 16 may be provided with ventilating apertures 125 and 126.

Figure 21:
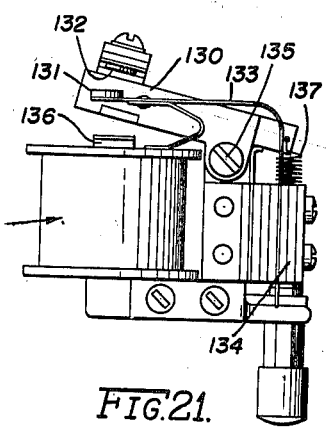
Figure 21 is a detail view showing the automatic single throw cut-out switch schematically shown in the wiring diagram illustrated in Figure 9.

In order to automatically control the cooperation of the electric motor and to insure uniform results without relying upon the judgment of the attendant, an electric manual switch 127 of a self-opening spring type is mounted in the wall of the housing 100 to initiate the full load operation of the motor 12 and control the source of power thereto when the hopper 60 has been charged with the plastic substance 10. In consequence thereof, the current drain on the motor 12 will be extremely high and perhaps constitute a momentary overload so as to energize a single throw relay switch 128 (Figure 21) connected to the power line 129—129' and the switch 127 to close the circuit to the electric motor 12 after the self-opening switch 127 has been released by the attendant.

The relay 128 is provided with a coil designed to pull an armature 130 at a full load that will average or approximate 900 watts for a quarter horse power motor 12 operating at substantially 1750 R. P. M. This load continues until the refrigerated mass 10 has been fully comminuted by the upper rotating member 102 for transmission to the lower agitator beater 103 to effect the conversion thereof into the desired plastic consistency at which time the motor 12 has a power drain of substantially 300 watts for 110 volt A. C. motor. At this moment when the consistency of the initial plastic mass 10 is reduced to a plastic state at the desired overrun, the relay coil 128 is such as to release the armature 130 at this current drain so as to break the circuit through confronting terminals 131 and 132, these being supported by a spring bracket 133 and the armature 130 for insulated mounting on the frame 134 and armature 130, respectively.

The armature 130 is pivoted about a fulcrum 135 in the path of a core 136 of the relay coil 128 to contact the armature 130 and impart a counter-clockwise movement thereto (viewed from Figure 21) when the relay coil 128 has been maintained energized by a load on the motor 12 that exceeds 300 watts. A spring 137 is anchored at one end to the frame with the other end thereof connected to the extremity of the armature 130 to normally urge such in a clockwise direction (viewed from Figure 21) which will translate the armature 130 to separate the terminals 131 and 132 from contact with each other to open the circuit and deenergize the motor 12, thereby indicating when the initial refrigerated mass 10 has been converted to its proper plastic consistency through this automatic motor control.

In order to effect the discharge of the plastic substances after the motor 12 has become deenergized, another switch 138 having a resiliently mounted pole 139 thereon (Figure 3) is connected to the power line 129—129' to cut in the motor 12 responsive to opening the valve 51. The valve 51 is opened by displacement in a counterclockwise direction (viewed from Figure 3) in conjunction with its mounting pintle 53. It is to be noted the valve pintle 53 is provided with a trip 140 which is rotated with the pintle 53 and valve 51 in the path of the resiliently mounted switch pole 139 to open the switch 138 when the valve 51 is disposed over the discharge opening 49. When the valve 51 is displaced from the discharge housing opening 49, however, the circuit is closed ahead of the manual switch 127 and relay switch 128, thereby enabling the discharge of the plastic mass 10 after it has been properly converted to the desired consistency for discharge into a receptacle such as a glass, ice cream cone, other type of container responsive to the action of the lower agitator member 68.

In order that the consistency of the plastic mass 10 may be still further changed or adjusted by the operator after the relay switch 128 has opened and while the valve 51 is still closed, a manual switch 141 is placed in parallel with the switch 138. The switch 138 has one of its terminals connected to the power line extension 129" that is electrically connected to one of the terminals of the motor 12, and the main wire line 129' is connected to the other terminal thereof (Figure 9). Now, then, in order to preclude the motor 12 to be energized when the feed plunger 65 has been elevated substantially above the hopper door 61 and thus permit the attendant to accidentally lodge his fingers in the hopper 60 for possible serious injury responsive to the rotation of the comminuting and agitator members 102—103, a switch button 142 is carried by a resilient strap 143 to normally project the button 142 through an aperture 144 provided in the rear wall of the hopper 60 opposite the door opening 63 therein.

The switch terminal button 142 is disposed in the path of the plunger 65 to be displaced outwardly when the latter is positioned to close the door opening 63 of the hopper 60 in forcing the edible refrigerated unit 10 downwardly into the path of the rotating comminuter 102. When the stitch button 142 is displaced outwardly of the hopper 60 through the aperture 144, the switch 145 is closed. The switch 145 is attached to the hopper 60 (Figure 10) in the path of the actuator button 142. Lead wires connect the switch 145 in series with the main wire lead 129' to close the circuit to the power source when the feed plunger 65 is in operative position to close the hopper opening 63. This insures against injury to the attendant's finger or hand in that the switch button 142 will protrude into the hopper 60 through the aperture 144 to break the motor circuit through the switch 145 and preclude energization of the motor 12 in the event the feed plunger 65 is in its extreme elevated position in the hopper 60 even though the manual switch 127 or valve switch 138 or both are closed. The entire circuit is controlled by means of a double pole-single throw line switch 145' in series with the main wire leads 129—129'.

This insures the utmost safety in the operation of the instrumentalities described supra, and affords the automatic shut-off when the power has reduced to a predetermined limit calibrated and determined by the load on any particular motor 12 when the proper conversion of the mass 10 to the desired plastic consistency has been effected by the members 102—103. It is to be noted that the switch 145 and actuator button 142—143 are readily removable as a unit to permit the hopper 60 to be effectively cleansed. In the present embodiment, the relay switch coil 128 is provided with an adjustable resistor element 146 (Figure 9) that enables a variation at which the relay switch 128 will cut-out the motor 12 depending upon the requirements of commercial practice and the particular substances that are being converted or processed in the manner described herein.

This adjustment enables an attendant to uniformly produce the desired consistency even though there may be variations in compositions. It should be observed that the initial refrigerated edible substances 10 may be of any desired flavor and the proper portion of flavor extracts and preferably fresh fruits such as strawberries, bananas, raspberries, and other ingredients of this character included that are commonly found in frozen confections such as ice cream to afford the proper taste variations to meet all purchase demands and individual taste requirements. This is provided for at the factory and each vendor can be supplied with a supply of properly varied and proportioned frozen units 10 for conversion into a plastic freeze with instrumentalities of the type described.

The modified type of agitator members 102' and 103' are shown in Figures 15 to 20. In this modified embodiment, the blades 104' and 105' of the upper comminuting member 102' are preferably though not essentially constructed from flat stainless steel sheet members. These are curved to assume a helical convolute form with their extremities disposed at an approximate 180° angular spread to procure the best results. The forward edges 111' and 112' of the blades 104'—105', respectively, are ground to knife sharpness so as to effectively comminute the frozen units 10 responsive to the counterclockwise rotation thereof (viewed from Figure 17). In this embodiment, a bearing 108' is carried by a diametrically disposed end member 109' that is welded or otherwise attached to the blades 104'—105' inwardly of their forward extremities (Figure 15) to permit the forward ends to accommodate a housing surface cleansing plate 147.

The housing cleansing scraper blade 147 is ground to knife sharpness on opposite forward half edges thereof as at 148 and 149 (Figure 17) to effectively remove any and all substances adhering to the wall of the hopper and to throw such inwardly in the path of the blades 104'—105'. Thus, the end wall 43 of the housing 44 will be maintained free from excess adhering substance and further comminuting operation is effected on otherwise waste substances to insure their eventual transfer downwardly into the lower agitator member 103' for eventual discharge as will appear more fully hereinafter.

It will be observed, also, that the rear end plate 106' of the comminuting member 102' is preferably disposed for contact with the rear housing wall 44' to remove any and all substances adhering thereto. The end member 106' is ground at opposite half edges 150 to more effectively remove the substances and to impart the displacement thereof toward the front of the housing 44 within the effective range of the blades 104'—105'. The modified lower agitator member 103' is similar in construction to the upper comminuting member 102' except for the fact that both edges 115'—116' of the lower blades 113'—114' are rounded or dull rather than sharp as specified for the upper comminuting member 102'. This results in a more effective beating action imparted by the lower member 103' to the substances that are previously comminuted by the upper member 102'.

In this instance, the end member 120' carrying the shaft bearing 122' is disposed inwardly of the forward edges of the blades 113'—114' in a manner described in connection with the upper end member 102'. The forward extremities of the lower blades 113'—114' are also provided with an ejecting blade 147' having its opposite rearward half edges ground to knife sharpness as at 148' and 149', these scraping against the end surface near the discharge opening 49 of the mixing chamber so that the lower member 103' is more effective in discharging the last portion of the substances through the valve opening 49 and rendering the housing 44 self-emptying. The lower agitator member 103' is also provided with an end plate 119' carrying the bearing 121' to contact the rear housing wall 44', and the opposite edges thereof are ground as at 150' to remove and throw the substances forwardly that may otherwise adhere to the rear housing wall 44', thereby effecting the eventual discharge through the valved housing opening 49. It will be apparent, therefore, that with the modified comminuting and agitator members 102' and 103', respectively, more effective self-cleaning operation is obtainable.

Various changes may be made in the embodiment of the invention herein specifically described without departing from the invention or sacrificing any of the advantages or features thereof and nothing herein shall be construed as limitations upon the invention, its concept or structural embodiment as to the whole or any part thereof except as defined in the appended claims.

I claim:

1. In a device for processing normally liquid substances frozen to a substantially solid state, the combination with a feeding chamber for receiving a preformed unit of frozen substances conforming substantially to said feeding chamber, of a plasticizing chamber communicating with said feeding chamber, agitator means in said plasticizing chamber, means for operating said agitator means, means for displacing the frozen unit from said feeding chamber into said plasticizing chamber against said agitator means, said plasticizing chamber being sized to be substantially filled by the plasticized substances resulting from the preformed unit of frozen substances responsive to the operation of said agitator means to control the air overrun in the resultant product, and valve means associated with said plasticizing chamber to control the discharge of the plasticized substances therefrom responsive to substances propulsion by said agitator means.

2. In a device for processing normally liquid substances frozen to a substantially solid state, the combination with a feeding chamber for receiving a predetermined charge of frozen substances conforming substantially to the capacity thereof, a plasticizing chamber communicating with said feeding chamber, said plasticizing chamber being sized to be substantially filled by the plasticized substances resulting from the preformed unit of frozen substances responsive to the operation of said agitator means to control the air overrun in the resultant product, a plurality of agitators mounted in said plasticizing chamber, said agitators having blades extending within a substantially uniform small clearance distance from the interior of said plasticizing chamber, means for operating said agitators so that their blades traverse a predetermined path of travel, said plasticizing chamber being substantially 8-shaped to conform to the extreme path of agitator blade travel, means for displacing the frozen substances from said feeding chamber into said plasticizing chamber within the path of said moving agitator blades, said displacing means serving as a closure in its extreme position of displacement for said plasticizing chamber, and valve means associated with said plasticizing chamber to control the discharge of the plasticized substances therefrom.

3. In a device for processing normally liquid substances frozen to a substantially solid state, the combination with a feeding chamber for receiving a predetermined charge of frozen substances conforming to the capacity thereof, a plasticizing chamber communicating with said feeding chamber, a plurality of agitators having axial shafts arranged in a common plate one with another for rotation within said plasticizing chamber, said agitators being disposed to effectively traverse the interior of said plasticizing chamber within close clearance to the confining walls thereof, means for relatively rotating said agitators within said plasticizing chamber, means for displacing the frozen substances from said feeding chamber into said plasticizing chamber, said displacing means serving as a closure in its extreme position of displacement for said plasticizing chamber, said plasticizing chamber being sized to be substantially filled by the plasticized substances resulting from the operation of said agitators, and valve means associated with said plasticizing chamber to control the discharge of plasticized substances therefrom.

4. In a device for processing normally liquid substances frozen to a substantially solid state, the combination with a feeding chamber for receiving a predetermined charge of frozen substances conforming to the capacity thereof, a plasticizing chamber communicating with said feeding chamber, agitator means in said plasticizing chamber, said plasticizing chamber having confronting confining walls shaped to conform substantially with the extreme outer agitator path of travel, said agitator means being arranged to effectively traverse substantially the entire interior of said plasticizing chamber within close proximity to the confining walls thereof, means for operating said agitator means, means for displacing the frozen substances from said feeding chamber into said plasticizing chamber, said displacing means having a face thereof conforming to the shape of said plasticizing chamber to serve as a closure therefor in its extreme position of displacement for said plasticizing chamber, said plasticizing chamber being sized to be substantially filled by the plasticized substances resulting from the predetermined charge of frozen substances responsive to the operation of said agitator means, and valve means associated with said plasticizing chamber to control the discharge of the plasticized substances therefrom.

5. In a device for processing normally liquid substances frozen to a substantially solid state, the combination with a vertical feeding chamber for receiving a predetermined charge of frozen substances conforming to the capacity thereof, a plasticizing chamber disposed beneath said vertical feeding chamber for communicating with said feeding chamber, a pair of revoluble agitators superposed for rotation to said plasticizing chamber, said plasticizing chamber being shaped to conform substantially to the path of travel of said agitators which extend within close clearance therefrom, means for operating said agitators, means for displacing the frozen substances from said feeding chamber into said plasticizing chamber, said displacing means having its feeding end conforming to the shape of said plasticizing chamber to serve as a closure therefor in its extreme position of displacement for said plasticizing chamber, said plasticizing chamber being sized to be substantially filled by the plasticized substances resulting from the predetermined charge of frozen substances responsive to the operation of said agitators, and valve means associated with said plasticizing chamber to control the discharge of the plasticized substances therefrom.

6. In a device for processing normally liquid substances frozen to a substantially solid state, the combination with a feeding chamber for receiving a predetermined charge of frozen substances conforming to the capacity thereof, a plasticizing chamber communicating with said feeding chamber, agitators arranged in line with one another in said plasticizing chamber to traverse overlapping paths, said plasticizing chamber having confronting confining walls shaped to conform substantially with the extreme path of travel of the outer edges of said agitators, said agitators having blades arranged to effectively traverse substantially the entire interior of said plasticizing chamber within close clearance distance to the confining walls thereof, one of said agitators being directly in the path of said feeding chamber, the blades of said last named agitator having sharp substance cutting edges to rapidly comminute the frozen substances entering said feeding chamber, means for operating said agitators, means for displacing the frozen substances from said feeding chamber into said plasticizing chamber, said displacing means serving as a closure in its extreme position of displacement for said plasticizing chamber, said plasticizing chamber being sized to be substantially filled by the plasticized substances resulting from the predetermined charge of frozen substances responsive to the operation of all of said agitators, and valve means associated with said plasticizing chamber to control the discharge of the plasticized substances therefrom.

7. In a device for processing normally liquid substances frozen to a substantially solid state, the combination with a vertical feeding chamber for receiving a predetermined charge of frozen substance conforming to the capacity thereof, a plasticizing chamber disposed beneath said vertical feeding chamber communicating with said feeding chamber, a pair of revoluble agitators superposed for rotation in said plasticizing chamber, the upper of said superposed revoluble agitators having sharp frozen substance cutting edges and arranged with the lower agitator to effectively traverse substantially the entire interior of said plasticizing chamber, means for operating said agitators, means for displacing the frozen substances from said feeding chamber into said plasticizing chamber, said displacing means serving as a closure in its extreme position of displacement for said plasticizing chamber, said plasticizing chamber being sized to be substantially filled by the plasticized substances resulting from the predetermined charge of frozen substances responsive to the operation of said agitators, and valve means associated with said plasticizing chamber to control the discharge of the plasticized substances therefrom.

8. In a device for processing normally liquid substances frozen to a substantially solid state, the combination with a vertical feeding chamber for receiving a predetermined charge of frozen substances conforming to the capacity thereof, a plasticizing chamber disposed beneath said vertical feeding chamber for communicating with said feeding chamber, a pair of superposed revoluble substance agitator members journalled in said plasticizing chamber, said agitator member being helicular in shape, the upper agitator member having sharp substance cutting edges, the lower agitator member having dull substance beating edges, means for operating said agitator means, means for displacing the frozen substances from said feeding chamber into said plasticizing chamber, said displacing means serving as a closure in its extreme position of displacement for said plasticizing chamber, said plasticizing chamber being sized to be substantially filled by the plasticized substances resulting from the predetermined charge of frozen substances responsive to the operation of said agitator means, and valve means associated with said plasticizing chamber to control the discharge of the plasticized substances therefrom.

9. In a device for processing normally liquid substances frozen to a substantially solid state into a preformed unit, the combination with a feeding chamber for receiving a preformed unit of the frozen substances conforming to the capacity thereof, a plasticizing chamber communicating with said feeding chamber, agitator means in said plasticizing chamber, means for displacing the frozen preformed unit from said feeding chamber into said plasticized chamber and serve as a closure therebetween during the operation of said agitator means, electric power means for said agitator means responsive to the insertion of said displacing means in said feeding chamber, said plasticizing chamber being sized to be substantially filled by the plasticized substances resulting from the preformed unit responsive to the operation of said agitator means, means responsive to the consistency of the substances in said plasticizing chamber to render said power means inoperative, and valve means communicating with said plasticizing chamber to control the discharge of the plasticized substances therefrom responsive to the operation of said agitator means.

10. In a device for processing normally liquid substances frozen to a substantially solid state into a preformed unit, the combination with a feeding chamber for receiving a preformed unit of the frozen substances conforming to the capacity thereof, a plasticizing chamber communicating with said feeding chamber, a pair of oppositely rotating helicular superposed agitator members journalled in said plasticizing chamber, means for displacing the frozen preformed unit from said feeding chamber into said plasticizing chamber and serve as a closure therebetween during the operation of said agitator means, electric power means for said agitator means responsive to the insertion of said displacing means in said feeding chamber, said plasticizing chamber being sized to be substantially filled by the plasticized substances resulting from the preformed unit responsive to the operation of said agitator means, electrical means responsive to the consistency of the substances in said plasticizing chamber to render said power means inoperative, and valve means communicating with said plasticizing chamber to control the discharge of the plasticized substances therefrom responsive to the operation of said agitator means.

11. In a converter device for units of normally liquid materials frozen to a substantially solid state, the combination with a container having an entrant orifice adapted to receive units of the aforesaid material in a solid state, of severing means for progressively removing portions of the solid unit, agitator means in said container, means for driving said severing means and said agitator means, said agitating means serving to plasticize and discharge said material, and means for feeding the solid units to said container in the path of said severing means, whereby the solid units are reduced to a substantially plastic state without the addition of any liquid to said container.

12. In a converter device for units of normally liquid materials frozen to a substantially solid state, the combination with a container having an entrant orifice adapted to receive preformed units of the aforesaid material in a solid state, of helical severing means in said container for progressively removing portions of the solid unit responsive to being displaced through the entrant orifice into said container, agitator means in said container, means for driving said severing means and said agitator means, said agitating means serving to plasticize and discharge said material, and means for feeding the solid units to said container in the path of said severing means, whereby the solid units are reduced to a substantially plastic state without the addition of any liquid to said container.

13. In a converter device for units of normally liquid materials frozen to a substantially solid state, the combination with a container having an entrant orifice adapted to receive units of the aforesaid material in a solid state, of severing means for progressively removing portions of the solid unit, agitator means in said container, means for driving said severing means and said agitator means, said agitating means serving to plasticize and discharge said material, valved outlet means in communication with said container to control the discharge effected by said agitating means, and means for feeding the solid units to said container in the path of said severing means, whereby the solid units are reduced to a substantially plastic state without the addition of any liquid to said container.

14. In a converter device for units of normally liquid materials frozen to a substantially solid state, the combination with a container having an entrant orifice adapted to receive preformed units of the aforesaid material in a solid state, of severing means in said container for progressively removing portions of the solid unit, agitator means in said container, means for driving said severing means and said agitator means, said agitating means serving to plasticize and discharge said material, and means for feeding the solid units to said container in the path of said severing means, whereby the solid units are reduced to a substantially plastic state without the addition of any liquid to said container.

15. In a converter device for units of normally liquid materials frozen to a substantially solid state, the combination with a container having an entrant orifice adapted to receive units of the aforesaid material in a solid state, of severing means for progressively removing portions of the solid unit, helicular agitator means in said container, valved discharge means in communication with said container, power means for driving said severing means and said agitator means in opposed directions, said agitating means serving to plasticize and discharge said material, means operative responsive to said valved discharge means to render said driving means active for discharging the substance after said last-named means has been rendered active, and means for feeding the solid units to said container in the path of said severing means, whereby the solid units are reduced to a substantially plastic state without the addition of any liquid to said container.

16. In a converter device for units of normally liquid materials frozen to a substantially solid state, the combination with a container having an entrant orifice adapted to receive units of the aforesaid material in a solid state, of helicular severing means adjacent said entrant orifice for progressively removing portions of the solid unit, helicular agitator means in said container below said severing means, means for driving said severing means and said agitator means in opposed directions said agitating means serving to plasticize and discharge said material, means for rendering said driving means inactive responsive to a predetermined load thereon governed by the consistency of the agitated substances, and means for feeding the solid units to said container in the path of said severing means, whereby the solid units are reduced to a substantially plastic state without the addition of any liquid to said container.

17. In a converter device for units of normally liquid materials frozen to a substantially solid state, the combination with a casing, of a pair of superposed revolvable members journaled in said casing; one of said members adapted to progressively sever portions of the solid unit and the other member adapted to beat the substance removed by the first member, power means for rotating said members at high speed, there being a discharge orifice in said casing substantially aligned with the beating member, a closure removably associated with said orifice to control discharge therethrough responsive to the rotation of said members, and means for feeding the solid units to said casing in the path of said severing member, whereby the solid units are reduced to a substantially plastic state without the addition of any liquid to said container.

18. In a converter device for a predetermined serving of normally liquid materials preformed into a solid unitary state, the combination with a casing, of a pair of superposed revolvable substance engaging members journaled in said casing for progressively removing and beating portions of the preformed solid unit, power means for rotating said revolvable members in opposed directions at high speed, there being a discharge orifice in said casing substantially aligned with the lower of said members, a closure removably associated with said orifice to control discharge therethrough responsive to the rotation of said members, and means for feeding the solid units so said casing in the path of said severing member, whereby the solid units are reduced to a substantially plastic state without the addition of any liquid to said container.

19. In a converter device for a predetermined serving of normally liquid materials performed into a substantially solid unit, the combination with a casing having an entrant orifice adapted to receive units of the aforesaid material in a solid state, of a pair of superposed revolvable substance engaging members journaled in said casing for progressively removing and beating portions of the preformed solid unit, power means for rotating said revolvable members in opposed directions at high speed, there being a discharge orifice in said casing substantially aligned with the lower of said members, a closure removably associated with said orifice to control discharge therethrough responsive to the rotation of said members, and means for feeding the solid units to said container in the path of the upper of said rotatable members, whereby the solid units are reduced to a substantially plastic state without the addition of any liquid to said container.

20. In a converter device for a predetermined serving of normally liquid materials preformed into a substantially solid unit, the combination with a casing having an entrant orifice, a feeding chamber communicating with said casing through said orifice and adapted to receive preformed units of the aforesaid material in a solid state, a pair of superposed revolvable members journaled in said casing, said members adapted to successively remove portions of the solid unit, and plasticize the removed portions in said container, power means for driving said revolvable members in opposed directions, said agitating means serving to plasticize and discharge said material, and means for feeding the solid units from said feeding chamber into the path of said upper revolvable member, whereby the solid units are reduced to a substantially plastic state without the addition of any liquid to said container.

RUSSELL STOVER.